United States Patent

[11] 3,618,818

[72] Inventors André Puyo
 Paris;
 Jack Picaut, Paris; Robert Saglio, Antony, all of France
[21] Appl. No. 878,769
[22] Filed Nov. 21, 1969
[45] Patented Nov. 9, 1971
[73] Assignee Coyne et Bellier, Bureau D'Ingenieurs-Conseils
 Paris, France
[32] Priority Nov. 28, 1968
[33] France
[31] 175684

[54] PRESSURE-RESISTANT ENCLOSURE
 10 Claims, 3 Drawing Figs.
[52] U.S. Cl. .................................................. 220/71, 220/3
[51] Int. Cl. .................................................. B65d 7/44
[50] Field of Search ..................................... 220/3, 71; 217/91-94

[56] References Cited
 UNITED STATES PATENTS
 3,144,952 8/1964 Uhlig et al. .................. 220/3
 3,377,757 4/1968 Magers, Jr. .................. 220/71 X Primary Examiner—M. Henson Wood, Jr.
Assistant Examiner—Gene A. Church
Attorney—Karl F. Ross ABSTRACT: A generally cylindrical vessel subject to internal pressure is surrounded by one or more hoops each consisting of at least one winding of a flat strip bearing upon a multiplicity of peripherally spaced webs under the pressure of spring-loaded clamping plates mounted on these webs.

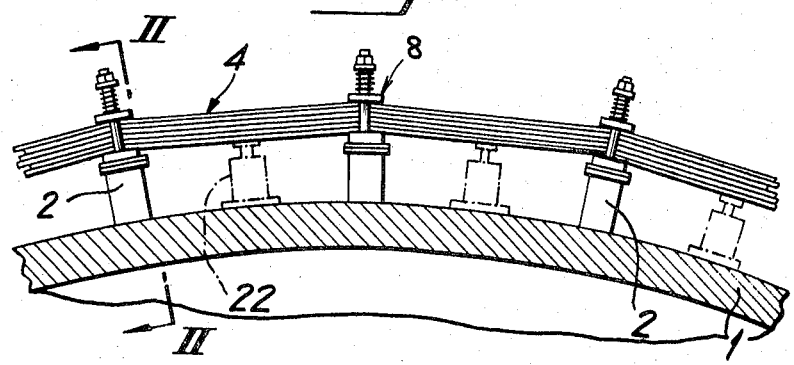
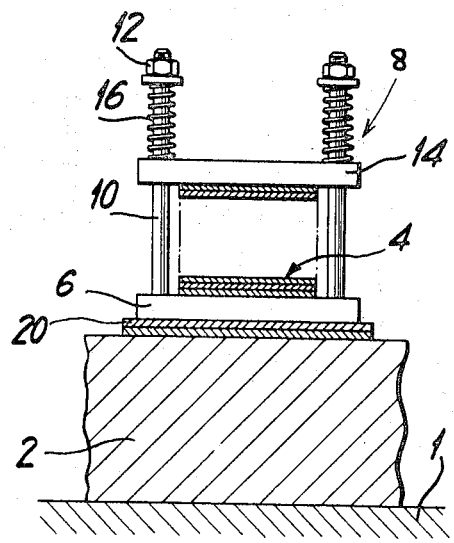
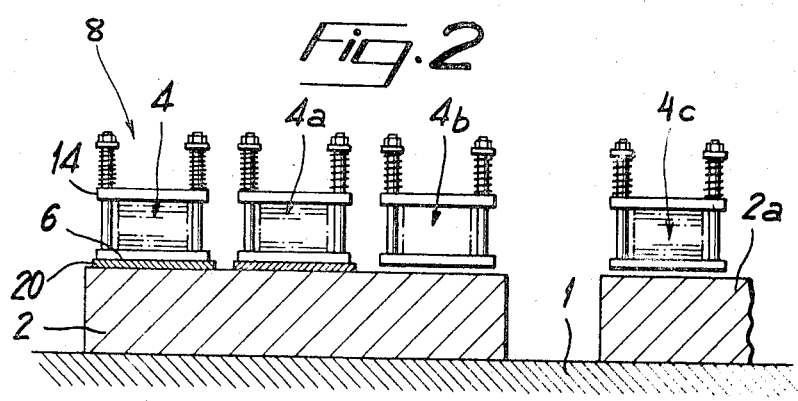

PRESSURE-RESISTANT ENCLOSURE

Our present invention relates to a pressure-resistant enclosure in which outwardly acting radial forces are to be contained. Such enclosures may be used, for example, as storage tanks for liquefied gases (e.g., nitrogen) or as the shells of atomic reactors. They may, accordingly, consist of various materials, notably metal or concrete.

A conventional method of reinforcing such enclosures against outward pressures is to wind one or more stranded cables around their generally circular walls to form a hoop or a set of axially spaced hoops. As pointed out in commonly owned application Ser. No. 878,856 filed by André Puyo and Pierre André Habib, such cables are unsatisfactory for various reasons, including the facts that the several strands contact one another only at isolated points and that the combined cross-sectional area of these stands is necessarily considerably smaller than the overall cross-sectional area of the cable with a consequent lowering of the mean tensile strength per unit area. These deficiencies are not materially remedied by the interposition of flat strips between successive layers of round strands, a construction which furthermore is complicated and expensive.

The general object of our invention, therefore, is to provide an improved reinforcement for such enclosures which is inexpensive to produce, simple to install and reliable in operation.

A more specific object of the instant invention is to provide means for uniformly distributing and developing stresses over the entire length of a reinforcement girding such an enclosure.

The above objects are realized, pursuant to the present invention, by the provision of a plurality of peripherally spaced external projections on the outer wall surface of a generally cylindrical enclosure, these projections supporting at least one flat strip wound in a multiplicity of turns therearound; the strip is resiliently clamped at each of the aforesaid projections so that its turns are held in mutual contact while being limitedly slidable relative to one another so as to equalize the tensile stress generated therein.

An expeditious way of applying the clamping pressure is to bracket the turns of the strip between two preferably flat clamp jaws and biasing these jaws toward each other with the aid of springs mounted on bolts that are rigid with one jaw and pass freely through the other; a pair of such bolts, flanking the strip, may guard against a lateral displacement of the turns which could cause unwinding of the hoop. To prestress the strip, tensioning means independent of the clamping springs may be brought to bear radially outwardly upon the strip, preferably in the form of shims or spacers interposed between each projection and the inner clamp jaw.

The above and other features of our invention will be described hereinafter in greater detail with reference to the accompanying drawing in which:

FIG. 1 is an axial sectional view of part of a cylindrical enclosure provided with several reinforcing hoops according to the invention;

FIG. 2 is a fragmentary cross-sectional view taken on the line II—II of FIG. 1, showing several clamping elements; and FIG. 3 is an enlarged view of a clamping element shown in FIG. 2.

In FIG. 1 we have shown part of a circularly cylindrical wall 1 enclosing a space under high pressure. A set of webs 2, extending axially at peripherally equispaced locations, project radially outwardly from the wall 1 to which they are secured by suitable means not shown. Each web 2 supports one or more clamps 8, e.g., three of them as illustrated in FIG. 2. A hoop 4 consists of a multiplicity of turns of flat, preferably resilient strip stock, e.g. of steel, passing through respective clamps 8 on each web 2. Thus, according to FIG. 2, three such hoops 4, 4a 4b are received by the damps axially spaced along web 2 whereas one or more additional hoops 4c are similarly supported on a further web 2a axially separated from web 2.

Each clamp 8 consists, as best seen in FIG. 3, of a pair of pressure plates or jaws 6, 14 interconnected by bolts 10 which flank the coiled strip 4 and are rigid with the inner plate 6 while passing freely through the outer plate 14, the free ends of the bolts being threaded to receive nuts 12 which bear upon the plate 14 through the intermediary of coil springs 16. The pressure of the springs 16 is so chosen that the turns of the strip 4 can undergo limited relative slippage to equalize their stress. As more fully explained in the commonly owned application referred to above, the strip experiences a certain amount of stretching between the clamp jaws so that its tensile stress varies approximately linearly over the length encompassed by these jaws while remaining substantially constant between two successive clamping stages. The stress differential developed across any clamping stage is thus inversely proportional to the number of such stages, and therefore to the number of abutments 2, on the assumption that the strip has enough mobility in the clamps to avoid any local overstressing.

In order to prestress the wall 1 against radially outward pressures, we provide tensioning means in the form of one or more shims 20 which are interposed between the webs 2 and the inner plates 6. To facilitate the insertion of these shims, hydraulic or pneumatic jacks 22 may be removably positioned on the wall 1 between successive webs 2 to urge the strip 4 outwardly, thereby lifting the adjoining clamps 8 off their supports 2. This has been illustrated in FIG. 2 for the clamps bracketing the strips 4b and 4c the strips 4 and 4a being already bolstered by interposed shims 20. In principle a single jack may be used to tension two or more adjoining hoops, yet a more sensitive adjustment is realized by the use of individual tensioning means.

If desired, additional clamps of the same resilient character as the devices 8 could be floatingly mounted on the strip 4 between webs 2. Also, intermediate projections not provided with clamps could be disposed between the webs 2 as supplemental abutments for the hoops. Finally, the turns of a strip do not have to contact one another directly but could be separated, particularly at the clamping points, by interposed foils of preferably the same order of thickness (e.g., upward of 0.1 mm.) as described in the commonly owned application Ser. No. 878,856 referred to above.

We claim:

1. An enclosure reinforced against internal pressures, comprising a generally cylindrical wall provided with peripherally spaced external projections, at least one flat elastic strip wound in a multiplicity of superposed turns with freedom of limited relative stress-equalizing slippage about said wall and bearing upon said projections, and clamping means resiliently maintaining the turns of said strip in mutual contact and alignment at said projections.

2. An enclosure as defined in claim 1 wherein said projections are axially extending webs supporting a plurality of such wound strips at axially spaced locations.

3. An enclosure as defined in claim 2 wherein said clamping means comprises independent clamps for each strip on said webs, said clamps resting freely on said webs.

4. An enclosure as defined in claim 1 wherein said projections are peripherally equispaced around said wall.

5. An enclosure as defined in claim 1 wherein said strip consists of metal.

6. An enclosure reinforced against internal pressures, comprising a generally cylindrical wall provided with peripherally spaced external projections, at least one flat strip wound in a multiplicity of turns about said wall and bearing upon said projections, and clamping means resiliently maintaining the turns of said strip in mutual contact at said projections; said clamping means comprising a pair of radially spaced jaws resting on each of said projections while bracketing said turns, and spring means urging said jaws toward each other.

7. An enclosure as defined in claim 6 wherein said jaws include an inner plate and an outer plate, said inner plate being provided with bolt means traversing said outer plate, said spring means surrounding said bolt means.

8. An enclosure as defined in claim 7 wherein said bolt means comprises a pair of axially spaced bolts flanking said turns.

9. An enclosure as defined in claim 7, further comprising tensioning means independent of said spring means bearing radially outwardly upon said strip.

10. An enclosure as defined in claim 9 wherein said tensioning means comprises spacing means interposed between said projections and said inner plates.

* * * * *